Patented May 5, 1925.

1,536,731

UNITED STATES PATENT OFFICE.

OSKAR SPENGLER, OF DESSAU, AND KARL KREUTZER, OF NUREMBERG, GERMANY, ASSIGNORS TO ACTIEN GESELLSCHAFT FÜR ANILIN FABRIKATION, OF BERLIN, GERMANY.

SULPHURIZED DYES.

No Drawing. Application filed January 25, 1924. Serial No. 688,601.

*To all whom it may concern:*

Be it known that we, OSKAR SPENGLER and KARL KREUTZER, citizens of the German Republic, residing at Dessau, Germany, and Nuremberg, Germany, have invented certain new and useful Improvements in Sulphurized Dyes, of which the following is a specification.

In the German specification 150,553 there are described new sulphurized dyes which are obtained by sulphurizing 4-arylamine-4'-hydroxydiarylamines with aid of polysulphides. They dye cotton blue tints.

Now we have found that the sulphurized dyes derived from the compound:

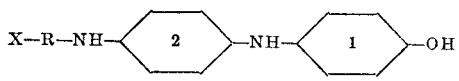

(R meaning an aromatic radical, X meaning an univalent radical, such as hydrogen, alkyl, alkoxyl, aralkyl, halogen) the nucleus 2 being substituted by chlorine, dye more reddish tints. These dyes have a great affinity for the vegetable fibers and are of an excellent fastness.

The following examples serve to illustrate our invention, the parts being by weight:

*Example 1:* Sulphur dye derived from 4-phenylamino 3.5-dichloro-4'-hydroxydiphenylamine:

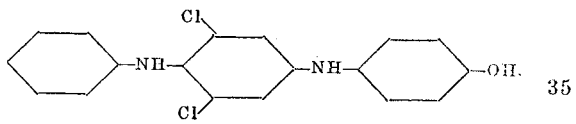

(The starting material is obtained by joint oxidation of 3.5-dichloro-1-amino-4-phenylaminobenzene with hydroxybenzene.)

80 parts of the described leucoindophenol are dissolved in 300 parts of a solution of crystallized sodium sulphide of 55% strength, 90 parts of sulphur are added. After boiling for 80–100 hours at a temperature of 106–109° C. the product of reaction is separated by addition of a diluted solution of common salt. The dye has in the dry state a metallic lustre; it dissolves in concentrated sulphuric acid to a blue solution and in a diluted solution of sodium sulphide to a vat from which cotton may be dyed in the usual manner. The violet tints thus obtained are of an excellent fastness to soaping, to boiling and to the action of light.

*Example 2:* Sulphur dye derived from 4-(para-methoxyphenylamino)-3.5-dichloro-4'-hydroxydiphenylamine:

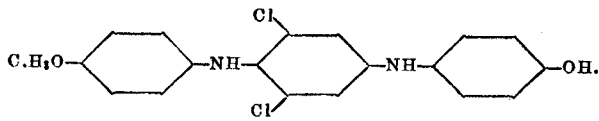

By sulphurizing this leucoindophenol in the manner described in Example 1 a dye is obtained of similar qualities as that described in Example 1.

*Example 3:* Sulphur dye derived from 4-(paraaminodiphenylamino)-3.5-dichloro-4'-hydroxydiphenylamine:

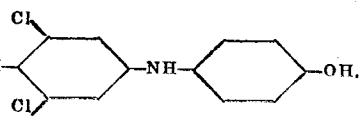

By sulphurizing this leucoindophenol a dye is obtained with excellent qualities dyeing more bluish tints than that described in Example 1.

*Example 4:* Sulphur dye derived from 4-(ortho-chloro-phenylamino)-3.5-dichloro-4'-hydroxydiphenylamine:

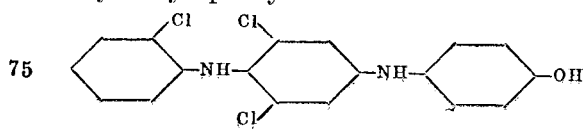

This leucoindophenol having been sulphurized under similar conditions furnishes a dyestuff dyeing bluish violet tints of the same excellent properties.

It is obvious to those skilled in the art that our invention is not limited to the foregoing examples or to the details given therein.

What we claim is,

1. The herein-described sulphur dyes being, in the dry sulphurized state, dark powders with a metallic luster, dissolving in concentrated sulphuric acid to blue solutions and in a diluted solution of sodium sulphide to vats from which cotton is dyed in bluish violet to violet tints, being derivatives of the leucoindophenols of the general formula:

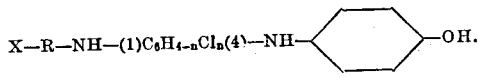

R meaning an aromatic radical, and X meaning a univalent radical.

2. The herein-described sulphur dyes being in the dry pulverized state dark powders with a metallic luster dissolving in concentrated sulphuric acid to blue solutions and in a diluted solution of sodium sulphide to vats from which cotton is dyed in bluish violet to violet tints being derivatives of the leucoindophenols of the general formula:

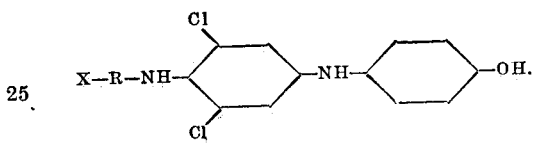

R meaning an aromatic radical, and X meaning an univalent radical.

3. The herein-described sulphur dyes being in the dry sulphurized state dark powders with a metallic luster dissolving in concentrated sulphuric acid to blue solutions and in a diluted solution of sodium sulphide to vats from which cotton is dyed bluish violet to violet tints being derivatives of the leucoindophenols of the general formula:

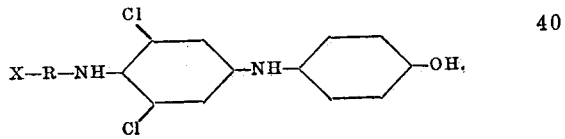

R being a radical of the benzene series, and X meaning an univalent radical.

4. The herein-described sulphur dye being in the dry pulverized state a dark powder with a metallic luster dissolving in concentrated sulphuric acid to a blue solution and in a diluted solution of sodium sulphide to a vat from which cotton is dyed violet tints, being a derivative of the leucoindophenol of the formula:

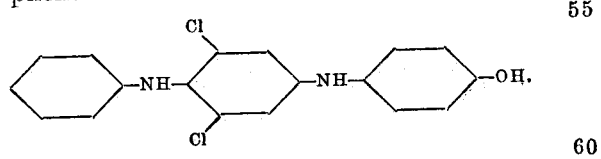

In testimony whereof we affix our signatures in presence of witnesses.

OSKAR SPENGLER.

Witnesses as to the signature of Oskar Spengler:
RUDOLPH FRICKE,
ALFRED ZUECKLER.

KARL KREUTZER.

Witnesses as to the signature of Karl Kreutzer:
ALEXEI PHILIPPOFF,
MARIE BAER.